(12) United States Patent
Higuchi et al.

(10) Patent No.: US 11,518,363 B2
(45) Date of Patent: Dec. 6, 2022

(54) METHOD AND DEVICE FOR CONTROLLING HYBRID VEHICLE

(71) Applicant: Nissan Motor Co., Ltd., Yokohama (JP)

(72) Inventors: Shinsuke Higuchi, Kanagawa (JP); Hidekatsu Akiyama, Kanagawa (JP); Azusa Kobayashi, Kanagawa (JP); Keisuke Kawai, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 48 days.

(21) Appl. No.: 16/771,972

(22) PCT Filed: Dec. 15, 2017

(86) PCT No.: PCT/JP2017/045210
§ 371 (c)(1),
(2) Date: Jun. 11, 2020

(87) PCT Pub. No.: WO2019/116576
PCT Pub. Date: Jun. 20, 2019

(65) Prior Publication Data
US 2021/0213934 A1  Jul. 15, 2021

(51) Int. Cl.
*B60W 20/14* (2016.01)
*B60L 7/14* (2006.01)
(Continued)

(52) U.S. Cl.
CPC ............... *B60W 20/14* (2016.01); *B60L 7/14* (2013.01); *B60L 58/15* (2019.02); *B60W 10/26* (2013.01);
(Continued)

(58) Field of Classification Search
None
See application file for complete search history.

(56) References Cited

U.S. PATENT DOCUMENTS

| 6,408,968 B1 | 6/2002 | Wakashiro et al. |
| 2008/0150490 A1* | 6/2008 | Koziara ............... H01M 10/48 320/137 |

(Continued)

FOREIGN PATENT DOCUMENTS

| CN | 105794077 A | 7/2016 |
| DE | 102016107379 A1 | 10/2016 |

(Continued)

*Primary Examiner* — Todd Melton
*Assistant Examiner* — Jason R Roberson
(74) *Attorney, Agent, or Firm* — Young Basile Hanlon & MacFarlane, P.C.

(57) ABSTRACT

A method for controlling a hybrid vehicle includes an engine, a battery charged with electric power generated by the engine, and a motor as a drive source and having multiple running modes that can be selected through a mode operation. As the running mode, the method for controlling a hybrid vehicle includes a normal mode configured to perform charging of the battery according to a running state; and a charge mode configured to electric power generation by the engine according to a mode operation, the method comprising setting an upper limit of charging electric power based on the generated electric power in the charge mode to be lower than an upper limit of charging electric power based on the generated electric power in the normal mode.

6 Claims, 6 Drawing Sheets

(51) Int. Cl.
  *B60L 58/15*   (2019.01)
  *B60W 10/26*   (2006.01)
(52) U.S. Cl.
  CPC .... *B60L 2260/20* (2013.01); *B60W 2510/244* (2013.01); *B60W 2510/246* (2013.01)

(56) References Cited

U.S. PATENT DOCUMENTS

2012/0283903 A1* 11/2012 Kusumi ................ B60L 58/15
                                              701/22
2014/0172216 A1   6/2014 Seto et al.
2016/0303985 A1  10/2016 Ueki
2016/0311425 A1* 10/2016 Miki .................... B60W 20/14
2020/0062124 A1*  2/2020 Haputhanthri .......... H02J 7/045

FOREIGN PATENT DOCUMENTS

| JP | H8-168103 A    | 6/1996  |
| JP | 2001-057709 A  | 2/2001  |
| JP | 2005-080330 A  | 3/2005  |
| JP | 2009-240116 A  | 10/2009 |
| JP | 2014-118079 A  | 6/2014  |

* cited by examiner

METHOD AND DEVICE FOR CONTROLLING HYBRID VEHICLE

TECHNICAL FIELD

The present invention relates to a method and a device for controlling a hybrid vehicle.

BACKGROUND ART

There is conventionally known a series hybrid electric vehicle that includes: an electric generator driven by an internal-combustion engine loaded onto the vehicle; a battery charged by the electric generator; and a motor that produces a driving force with discharging electric power of the battery. A series hybrid electric vehicle disclosed in JP2009-240116A has multiple modes related to an amount of electric power generation of an electric generator, an amount of charging/discharging of a battery, etc., and includes a voltage control unit that controls a target charging/discharging current value of the battery according to each of the modes.

SUMMARY OF INVENTION

The above-described voltage control unit has charging suppression mode in which charging while the vehicle is running is suppressed in terms of the protection of the battery, and controls the target charging/discharging current value (a charging/discharging state) when in this mode in a direction of discharging more electric power than when in normal mode, and controls the target charging/discharging current value in a direction of charging more electric power than when in power generation reduction mode in which power generation while the vehicle is running is suppressed.

Here, for example, in a case where there is a driver's demand for silent running by driving of a motor, it is desirable to keep an amount of battery charge at a high level in advance. However, the above-described series hybrid electric vehicle does not have a mode in which the amount of battery charge is actively controlled to high level while the vehicle is running according to the driver's demand.

Meanwhile, to control the amount of battery charge to high level according to the driver's demand, it is necessary to actively drive the electric generator according to the demand.

However, in terms of the protection of the battery, it is necessary to avoid the battery being charged to an amount equal to or larger than a predetermined amount in consideration of overcharge prevention, etc.; therefore, there may be a case where the battery cannot be charged even if there is a driver's demand to charge.

The present invention is intended to provide a technology to avoid the battery being charged to an amount equal to or larger than a predetermined amount while increasing an amount of battery charge according to a driver's demand to charge, by properly control charging/discharging of a battery.

According to an aspect of this invention, a method for controlling a hybrid vehicle including an engine, a battery charged with electric power generated by the engine, and a motor as a drive source and having multiple running modes that can be selected through a mode operation, the running modes including: a normal mode configured to perform charging of the battery according to a running state; and a charge mode configured to electric power generation by the engine according to a mode operation, the method comprising setting an upper limit of charging electric power based on the generated electric power in the charge mode to be lower than an upper limit of charging electric power based on the generated electric power in the normal mode.

Embodiments of the present invention is described in detail below with reference to the accompanying drawings.

DESCRIPTION OF EMBODIMENTS

Embodiment

An embodiment of a series hybrid electric vehicle to which a device for controlling a hybrid vehicle according to the present invention is applied is described below.

Figure 1:
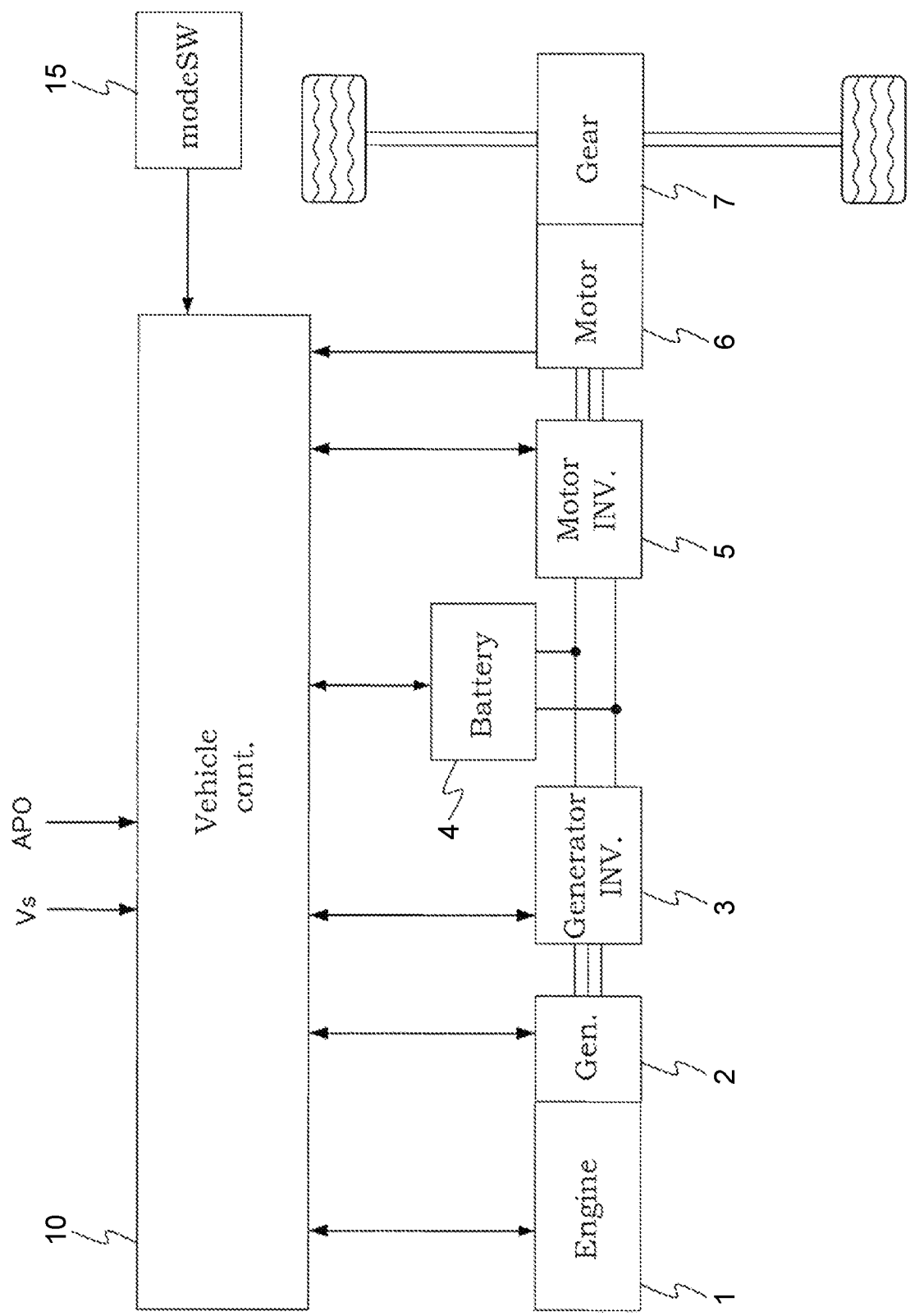
FIG. 1 is a schematic configuration diagram of a series hybrid vehicle to which a device for controlling a hybrid vehicle according to an embodiment is applied.

FIG. 1 is a block diagram showing a system configuration of the series hybrid vehicle to which the device for controlling the hybrid vehicle according to the embodiment is applied. FIG. 1 shows the series hybrid vehicle equipped with a motor for electric power generation (hereinafter, referred to as an electric generator 2) and a motor for driving (hereinafter, referred to as a drive motor 6).

The series hybrid vehicle (hereinafter, referred to simply as the vehicle) according to the present embodiment includes an engine 1, the electric generator 2, a generator inverter 3, a battery 4, a drive inverter 5, the drive motor 6, a reduction gear 7, a vehicle controller 10, and a mode SW 15.

The engine (internal-combustion engine) 1 is connected to the electric generator 2 through a gear (not shown), and transmits power for the electric generator 2 to generate electric power to the electric generator 2. It is to be noted that the vehicle to which the device for controlling the hybrid vehicle according to the present embodiment is applied is a series system, and thus the engine 1 is mainly used as a drive source for driving the electric generator 2 to rotate.

The electric generator 2 is rotated by the power from the engine 1, thereby generating electric power. That is, a driving force of the engine 1 is transmitted to the electric generator 2, and the electric generator 2 generates electric power with the driving force of the engine 1. Furthermore, at the start of the engine 1, the electric generator 2 also performs motoring in which the engine 1 is caused to crank up by using power of the electric generator 2 and the engine 1 is powered to run and rotate by using power of the electric generator 2, and thereby electric power is consumed.

The generator inverter 3 is connected to the electric generator 2, the battery 4, and the drive inverter 5, and converts alternating-current power generated by the electric generator 2 into direct-current power and supplies the direct-current power to the battery 4. That is, electric power generated by the electric generator 2 is charged into the battery 4. Furthermore, the generator inverter 3 converts direct-current power supplied from the battery 4 into alternating-current power, and supplies the alternating-current power to the electric generator 2.

The battery 4 is charged with electric power generated by the electric generator 2 and regenerative electric power of the drive motor 6, and also discharges drive power for driving the electric generator 2 and the drive motor 6. The battery 4 in the present embodiment includes a lithium-ion battery.

The drive inverter 5 converts direct-current power supplied from the battery 4 or the generator inverter 3 into alternating-current power, and supplies the alternating-current power to the drive motor 6. Furthermore, the drive inverter 5 converts alternating-current power regenerated by the drive motor 6 into direct-current power, and supplies the direct-current power to the battery 4.

The drive motor 6 produces a driving force with an alternating current supplied from the drive inverter 5, and transmits the driving force to a driving wheel through the reduction gear 7. Furthermore, the drive motor 6 produces a regenerative driving force when rotated along with the driving wheel, for example, when the vehicle is decelerated or while the vehicle is coasting, thereby collecting kinetic energy of the vehicle as electric energy. The collected electric energy is charged into the battery 4 as regenerative electric power.

The vehicle controller 10 includes, for example, a central processing unit (CPU), a read-only memory (ROM), a random access memory (RAM), and an input/output (I/O) interface. The vehicle controller 10 calculates motor torque command value to the drive motor 6 according to information on a vehicle state, such as accelerator position (accelerator opening degree), vehicle speed, and road surface gradient.

Furthermore, the vehicle controller 10 calculates an amount of target charging electric power of the battery 4 on the basis of a mode selected by the mode SW 15 to be described later and information such as SOC information of the battery 4, inputtable electric power of the battery 4, outputtable electric power, and an amount of regenerative electric power of the drive motor 6, and controls the amount of electric power generated by the electric generator 2 to achieve the calculated amount of target charging electric power.

More specifically, to adjust the amount of charging electric power of the battery 4 based on electric power from the electric generator 2, the vehicle controller 10 controls the engine 1, the electric generator 2, the generator inverter 3, and the battery 4. For example, the vehicle controller 10 controls the engine 1 so as to achieve a target amount of electric power generation of the electric generator 2, and adjusts an intake air amount of a throttle actuator, a fuel injection amount of an injector, and ignition timing of a spark plug according to a state signal representing the rotation speed, the temperature, etc. of the engine 1. A specific method to adjust the amount of charging electric power of the battery 4 will be described later.

Furthermore, the vehicle controller 10 measures a state of charge (SOC) on the basis of a current and a voltage that are charged into or discharged from the battery 4. Moreover, the vehicle controller 10 calculates inputtable electric power and outputtable electric power of the battery 4 according to the temperature, the internal resistance, and the SOC of the battery 4, and acquires the calculated values as basic information on chargeable and dischargeable electric power of the battery 4.

Furthermore, the vehicle controller 10 performs switching control on the drive inverter 5 according to a state such as the rotation speed and the voltage of the drive motor 6 so that the drive motor 6 achieves intended driving torque.

It is to be noted that all the above-described functions of the vehicle controller 10 do not have to be configured to be performed by the vehicle controller 10 alone as in the present embodiment. For example, an engine controller that controls the engine 1 may be provided separately so that multiple controllers perform the functions in a coordinated manner.

The mode switch (mode SW) 15 is a switch for mode selection (switching) provided to allow a driver or an occupant to alternatively select from multiple running modes. The running modes that can be selected by means of the mode SW 15 include at least normal mode, silent mode, and charge mode. In the following, differences in charging/discharging of the battery 4 among the modes are mainly described.

Normal mode is a mode at the time of normal running, and is a mode configured to control charging/discharging of the battery 4 according to a running state. The running state here is, for example, the SOC of the battery 4. In normal mode, for example, when the SOC becomes equal to or less than a predetermined specified value, the vehicle controller 10 causes the electric generator 2 to be driven by the engine 1 to charge the battery 4. Furthermore, in normal mode, a regenerative braking force equivalent to an engine brake in a general engine-driven vehicle is produced. It is to be noted that normal mode in the present embodiment is set in an initial state after start-up of a vehicle system.

Silent mode is a mode that allows for running with noise reduced further than in normal mode. In silent mode, charging of the battery 4 based on electric power generated by the electric generator 2 is not performed. Therefore, the vehicle in silent mode selected does not perform driving of the engine 1 for the purpose of generating electric power, and is caused to run silently by the drive motor 6 using only discharging electric power of the battery 4 as a power source. That is, the driver can intentionally cause the vehicle to run silently by selecting silent mode.

Charge mode is a mode configured to perform charging of the battery 4 more actively than when in normal mode. When charge mode is selected, electric power generation by the engine 1 is preferentially performed so that the SOC of the battery 4 reaches a preset reference value. That is, it can be said that charge mode is a mode configured to perform electric power generation by the engine 1 according to a mode operation made by the driver or the occupant, as against normal mode configured to perform power generation according to the running state. For example, when in normal mode, electric power generation by the engine 1 is not performed until the SOC of the battery 4 becomes equal to or less than the specified value (for example, equal to or less than 50%); however, when charge mode is selected, even if the SOC of the battery 4 is 60%, electric power generation by the engine 1 is forcibly performed, and charging of the battery 4 is started. That is, the driver can intentionally increase the SOC of the battery 4 by selecting charge mode, thereby causing electric power generation by the engine 1 to be performed. Thus, for example, by selecting charge mode before selecting silent mode, the SOC as of the start of silent mode selected subsequently to charge mode can be increased, and therefore a running distance in silent mode can be improved.

It is to be noted that in the present embodiment, charging of the battery 4 based on regenerative electric power of the drive motor 6 is performed regardless of any of the above-described running modes.

Incidentally, in terms of the protection of the battery 4, overcharging of the battery 4 should be avoided, and it is preferable to set an upper limit to the amount of charging electric power (the amount of chargeable electric power) of the battery 4. In the present embodiment, a "Li precipitation protection threshold" that is a threshold for avoiding lithium ions being precipitated inside the battery 4 is set as such an upper limit.

There is a possibility that lithium ions (metallic lithium) may be precipitated inside the battery 4 (a lithium-ion battery) due to the battery 4 being charged rapidly or excessively. The precipitated lithium ions, for example, short-circuit an internal circuit of the battery 4, which causes the battery 4 to deteriorate. The Li precipitation protection threshold set in the present embodiment is a value compared with an average charging current of the battery 4 in a predetermined time. The Li precipitation protection threshold is a threshold set to keep the amount of average charging current of the battery 4 in the predetermined time below this threshold so as to be able to prevent lithium ions from being precipitated inside the battery 4. In the present embodiment, 100 seconds is set as the predetermined time here; when the average charging current of the battery 4 in 100 seconds exceeds the Li precipitation protection threshold, charging of the battery 4 is suspended for a given time, thereby avoiding lithium ions being precipitated inside the battery 4. A stage in which charging of the battery 4 is suspended in this way is hereinafter referred to as a "charging prohibition stage".

It is to be noted that the predetermined time shown here is merely an example, and is not limited to this example. The predetermined time is appropriately set to a value that allows the propriety of the amount of charging electric power and the charging rate of the battery 4 to be determined in comparison with the Li precipitation protection threshold. For example, it may be configured that two kinds of 10 seconds and 100 seconds are set as the predetermined time, and, when the average charging current of the battery 4 in at least either one of the two predetermined times exceeds the Li precipitation protection threshold, charging of the battery 4 is suspended for the given time.

Here, in a case where the driver selects charge mode, charging of the battery 4 is performed actively as described above, and therefore the amount of charging electric power of the battery 4 becomes more likely to exceed the Li precipitation protection threshold. Then, it is possible that even though the driver selects charge mode to increase the amount of charging electric power of the battery 4, the average charging current of the battery 4 in the predetermined time exceeds the Li precipitation protection threshold, and thus the state of the battery 4 plunges into the charging prohibition stage and is not sufficiently charged even when in charge mode. This can result in a situation where when charge mode is canceled, for example, by selecting silent mode, the amount of charging electric power of the battery 4 becomes lower even though charge mode has been selected previously.

Accordingly, the vehicle controller 10 according to the present embodiment performs a power generation restriction process to avoid the state of the battery 4 plunging into the charging prohibition stage when in charge mode.

Figure 2:
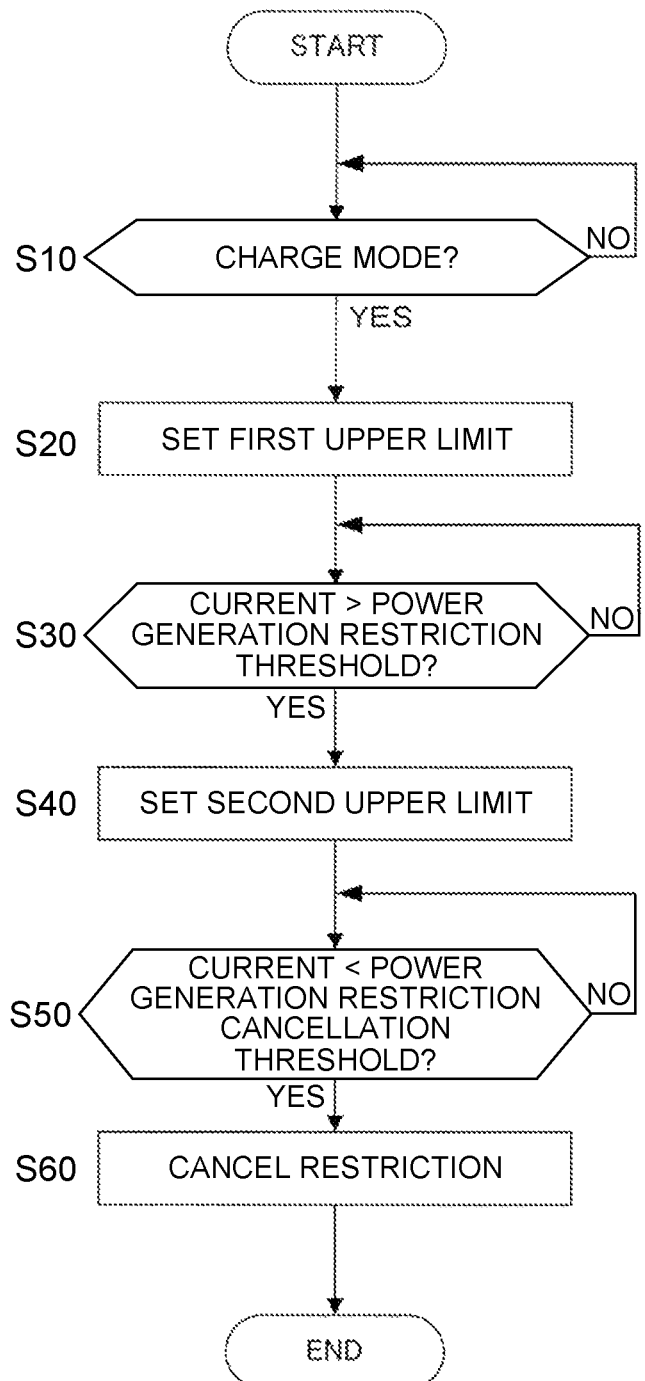
FIG. 2 is a flowchart showing the flow of a power generation control process according to the embodiment.

FIG. 2 is a flowchart showing the power generation restriction process according to the present embodiment. The vehicle controller 10 is programmed to repeatedly perform the power generation restriction process described below at a predetermined interval.

At Step S10, the vehicle controller 10 (hereinafter, referred to simply as "the controller 10") determines whether or not charge mode is selected as the running mode of the vehicle. In a case where it is determined that charge mode is selected, a process at Step S20 is performed.

In a case where it is determined that charge mode is not selected, power generation control applied to the current mode (normal mode or silent mode) is maintained. For example, in a case where silent mode is selected, the controller 10 prohibits electric power generation by the engine 1.

At Step S20, the controller 10 sets an upper limit (a first upper limit) of charging electric power when in charge mode. As described above, charge mode is a mode in which the driver intentionally drives the engine 1 to generate electric power; therefore, the average charging current in the predetermined time tends to increase, and the state of the battery 4 is more likely to enter the charging prohibition stage than when in normal mode. Therefore, at this step, the upper limit of the amount of charging electric power when in charge mode is set to be lower than when in normal mode. Thus, in charge mode, the amount of electric power generated by the engine 1 is restricted so that the amount of charging electric power of the battery 4 does not exceed the first upper limit; therefore, it is possible to prevent the average charging current in the predetermined time from tending to increase and make the state of the battery 4 less likely to enter the charging prohibition stage. It is to be noted that in the present embodiment, the amount of charging electric power based on regenerative electric power of the drive motor 6 is not restricted by the first upper limit and a second upper limit to be described later.

It is to be noted that the first upper limit in the present embodiment is set to several tens of kW; however, its value is approximately half of an upper limit (a normal upper limit) of charging electric power when in normal mode. Furthermore, the first upper limit may be adjusted according to at least one of the temperature of the battery 4, the SOC, and the vehicle speed in consideration of characteristics associated with the internal resistance, etc. of the battery 4. In the present embodiment, the first upper limit is set to a higher value as the temperature and the SOC of the battery 4 and the vehicle speed become higher.

At Step S30, the controller 10 determines whether or not the amount of average charging current of the battery 4 in a predetermined time exceeds a predetermined "power generation restriction threshold". The "power generation restriction threshold" is a threshold set to prevent an amount of average charging electric power of the battery 4 per predetermined time from exceeding the above-described Li precipitation protection threshold when in charge mode. Therefore, the power generation restriction threshold is set to a lower value than the Li precipitation protection threshold. Furthermore, the predetermined time here is applied with the same time as the above-described predetermined time used in comparison with the Li precipitation protection threshold.

Moreover, the Li precipitation protection threshold and the power generation restriction threshold in the present embodiment are also adjusted according to at least either the temperature or the SOC of the battery 4 in consideration of the characteristics associated with the internal resistance, etc. of the battery 4. For example, in the present embodiment, the Li precipitation protection threshold and the power generation restriction threshold are set to a lower value as the temperature and the SOC of the battery 4 become lower. It is to be noted that respective ranges of reduction in the Li precipitation protection threshold and the power generation restriction threshold when they are adjusted according to the temperature, etc. do not have to be the same. In the present embodiment, the Li precipitation protection threshold and the power generation restriction threshold are adjusted so that the range of reduction in the power generation restriction threshold is larger than the range of reduction in the Li precipitation protection threshold. That is, the Li precipitation protection threshold and the power generation restriction threshold are adjusted so that a difference between them becomes larger as the temperature or the SOC of the battery 4 becomes lower.

At Step S30, when it is determined that the amount of average charging current of the battery 4 in the predetermined time exceeds the power generation restriction threshold, a process at subsequent Step S40 is performed to further restrict the amount of charging electric power of the battery 4. In a case where it is determined that the amount of average charging current does not exceed the power generation restriction threshold, the process at Step S30 is repeatedly performed until it is determined that the amount of average charging current exceeds the power generation restriction threshold.

At Step S40, to prevent the battery 4 from entering the charging prohibition stage, the controller 10 sets the second upper limit as an upper limit of charging electric power when in charge mode. The second upper limit is set to a value lower than the first upper limit. Here, the concept of "power generation restriction" where electric power generation by the engine 1 is restricted by the second upper limit is described with reference to FIGS. 3 to 5.

Figure 3:
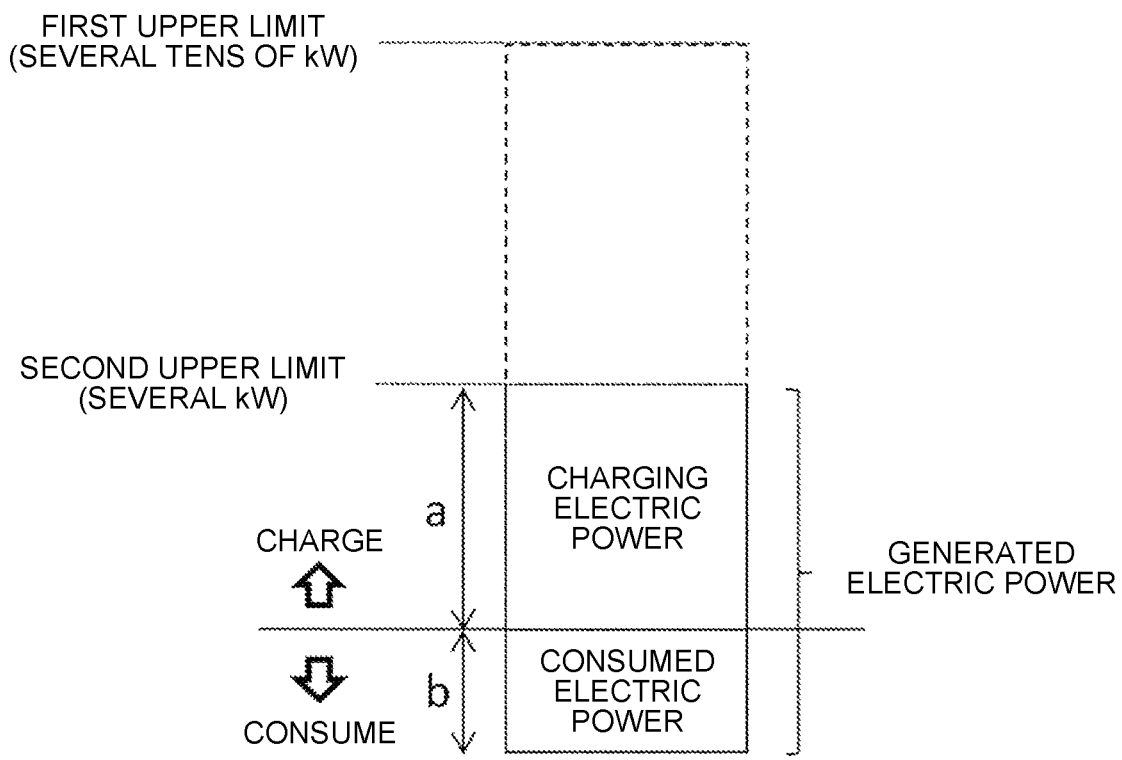
FIG. 3 is a diagram to explain the concept of power generation restriction.

FIG. 3 is a diagram to explain the concept of power generation restriction in a running state (a power running state) in which regenerative electric power is not generated. As shown in the diagram, the second upper limit is set to a value (in the present embodiment, several kW) lower than the first upper limit, and, after setting the second upper limit at Step S40, the controller 10 controls the amount of electric power generation of the engine 1 so that charging electric power of the battery 4 falls within a range indicated by two-way arrow a. For example, if the charging electric power is a value that reaches the second upper limit, electric power generated by the engine 1 becomes electric power (two-way arrows a+b) that charging electric power of an amount corresponding to the second upper limit and consumed electric power for driving the drive motor 6 and operating auxiliary equipment are added together.

Figure 4:
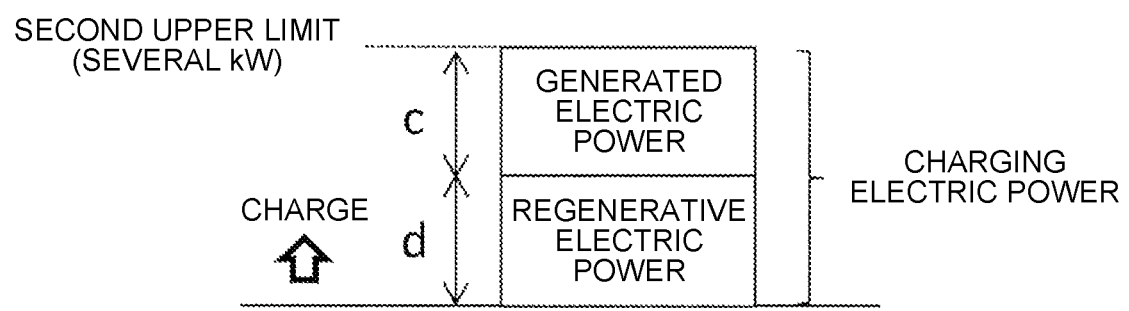
FIG. 4 is a diagram to explain the concept of the power generation restriction in a case where regenerative electric power is generated.

FIG. 4 is a diagram to explain the concept of power generation restriction in a running state in which regenerative electric power is generated. As shown in the diagram, regenerative electric power (two-way arrow d) is also charged, and thus, after setting the second upper limit, the controller 10 controls the amount of electric power generation of the engine 1 so that electric power (two-way arrows c+d) that the regenerative electric power and generated electric power are added together does not exceed the second upper limit. For example, if the charging electric power is a value that reaches the second upper limit, the amount of electric power generation of the engine 1 becomes electric power (two-way arrow c) that the regenerative electric power is subtracted from the second upper limit. It is to be noted that as for restriction using the first upper limit, it can be explained in the same manner by replacing the second upper limit in the diagram with the first upper limit.

Figure 5:
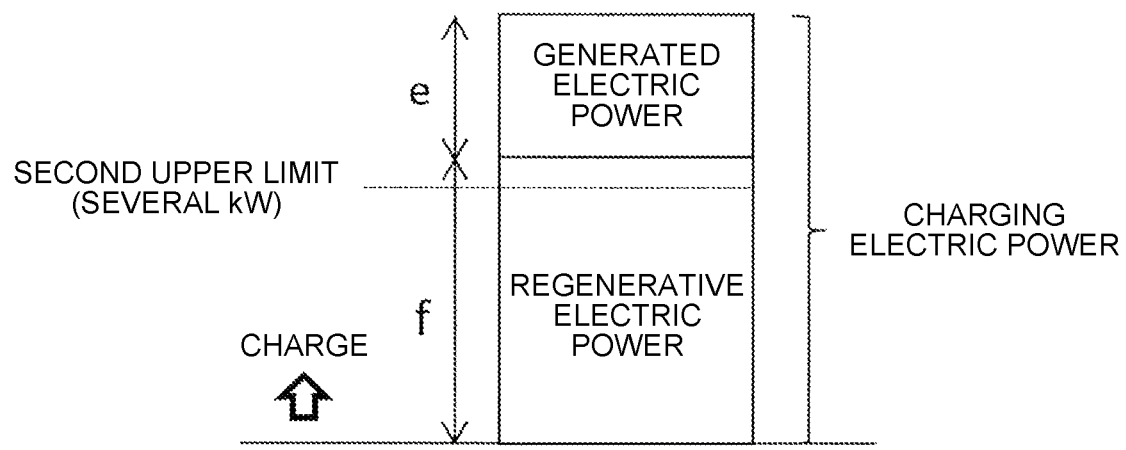
FIG. 5 is a diagram to explain the concept of the power generation restriction in a case where regenerative electric power exceeding a predetermined upper limit is generated.

FIG. 5 is a diagram to explain the concept of power generation restriction in a running state in which regenerative electric power of an amount exceeding the second upper limit is generated. The amount of charging electric power based on regenerative electric power of the drive motor 6 is not restricted by the first upper limit or the second upper limit; therefore, as shown in the diagram, in some cases, charging electric power based on regenerative electric power may exceed the second upper limit. Here, if generated electric power is controlled so that the sum of regenerative electric power and generated electric power does not exceed the second upper limit as described above with FIG. 4, it is necessary to shut down the engine 1 when the regenerative electric power exceeds the second upper limit and drive the engine 1 when the regenerative electric power goes below the second upper limit. Then, in a case where the regenerative electric power fluctuates around the second upper limit, driving and shut-down of the engine 1 is frequently repeated, and thus, there is a possibility of causing the driver to feel uncomfortable. Furthermore, charge mode is a mode in which the driver intentionally drives the engine 1, thereby actively performing charging; therefore, a state where the engine 1 is not driven even though charge mode has been selected may provide a state contrary to the driver's expectation.

Therefore, in the present embodiment, even in a case where regenerative electric power of an amount exceeding the second upper limit is generated as shown in the diagram, after setting the second upper limit, the controller 10 controls the amount of electric power generation of the engine 1 to be in a range in which charging electric power based on the amount of electric power generation of the engine 1 does not exceed the second upper limit. However, an upper limit of the amount of charging electric power based on generated electric power in this state may be an amount of electric power corresponding to the second upper limit, or may be set to a lower value according to the amount of regenerative electric power, etc. Thus, electric power generation by the engine 1 is continued in charge mode even in a case where regenerative electric power exceeds the second upper limit; therefore, even in a case where the regenerative electric power fluctuates around the second upper limit, it is possible to avoid driving and shut-down of the engine 1 being frequently repeated and get rid of the possibility of causing the driver to feel uncomfortable. However, in a case where regenerative electric power of an amount exceeding the second upper limit is generated giving priority to the protection of the battery 4, the charging electric power based on the amount of electric power generation of the engine 1 may be set to zero. That is, in a case where regenerative electric power of an amount exceeding the second upper limit is generated, the controller 10 can shut down the electric power generation by the engine 1. It is to be noted that as for restriction using the first upper limit, it can be explained in the same manner by replacing the second upper limit in the diagram with the first upper limit. However, in a case where regenerative electric power exceeds the first upper limit during the restriction using the first upper limit, it is preferable that the maximum value of charging electric power based on the amount of electric power generation of the engine 1 be the equivalent of the second upper limit.

As described above, at Step S40, the second upper limit of a value lower than the first upper limit set at Step S20 is set, which increases the amount of charging in charge mode early on within a range up to the first upper limit, and, after the second upper limit is set, further suppresses a possibility that the amount of average charging electric power may reach the Li precipitation protection threshold, and thus it is possible to avoid the state of the battery 4 plunging into the charging prohibition stage when the vehicle is in charge mode. When the second upper limit has been set at this step, a process at subsequent Step S50 is performed.

At Step S50, the controller 10 determines whether or not the amount of average charging current of the battery 4 in the predetermined time is below a "power generation restriction cancellation threshold". The "power generation restriction cancellation threshold" is a threshold set to determine whether or not to cancel the power generation restriction using the second upper limit. In other words, the power generation restriction cancellation threshold is a restriction cancellation hysteresis with respect to the power generation restriction threshold in power generation control when in charge mode. When it is determined that the amount of average charging current of the battery 4 goes below the power generation restriction cancellation threshold, a process at subsequent Step S60 is performed. When it is determined that the amount of average charging current does not go below the power generation restriction cancellation threshold, the process at Step S50 is repeatedly performed until it is determined that the amount of average charging current goes below the power generation restriction cancellation threshold.

At Step S60, the controller 10 cancels the second upper limit, thereby lifting the restriction of power generation from Step S40 onwards, and ends the power generation restriction process according to the present flow. The above is contents of the power generation restriction process when in charge mode performed by the controller 10 in the present embodiment. Subsequently, an actual example in a case where the above-described power generation restriction process is performed is described with reference to a time chart.

Figure 6:
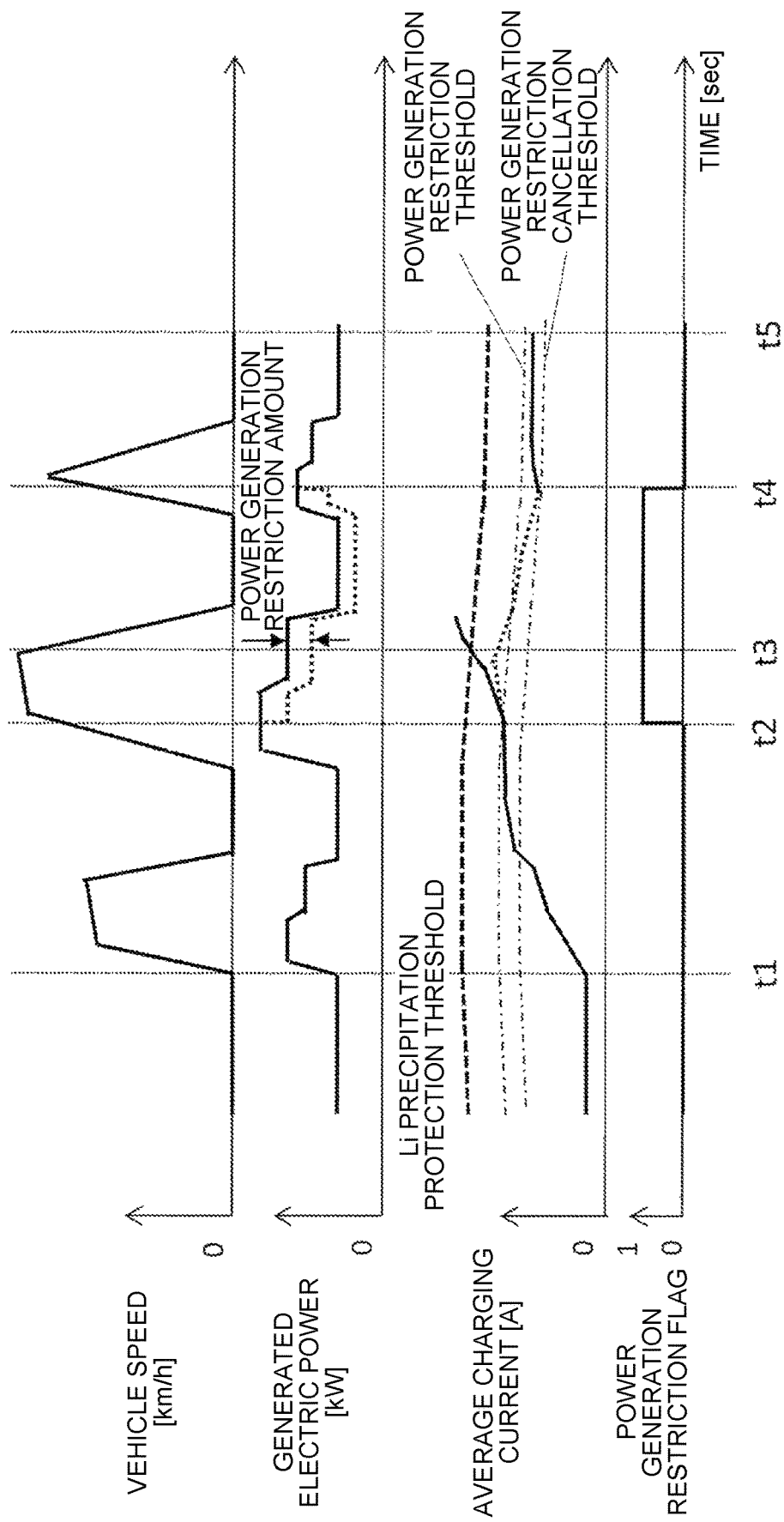
FIG. 6 is a time chart showing the behavior in the power generation control process according to the embodiment.

FIG. 6 is a time chart showing the behavior in the power generation restriction process when in charge mode.

FIG. 6 shows, from the top, vehicle speed [km/h], generated electric power [kW] of the engine 1, average charging current [A] of the battery 4 in a predetermined time (here, 100 sec), and power generation restriction flag (0 or 1). The horizontal axis indicates time [sec].

Furthermore, a solid line shown in each of the generated electric power [kW] of the engine 1 and the average charging current [A] of the battery 4 represents the behavior of each value in a state where charge mode is selected, and thereby the first upper limit is set; a dotted line portion represents the behavior of each value in a state where the second upper limit is set by power generation restriction. Moreover, the average charging current [A] of the battery 4 is shown together with the Li precipitation protection threshold indicated by a dotted line, and the power generation restriction threshold and the power generation restriction cancellation threshold that are each indicated by a dashed dotted line.

When the vehicle is in charge mode selected by the driver's operation, electric power generation by the engine 1 is forcibly performed until the battery 4 reaches a predetermined SOC; therefore, as shown in the chart, the average charging current [A] and the generated electric power [kW] always exhibit a positive value. However, although not shown in the chart, even when the vehicle is in charge mode, in some cases, electric power generation by the engine 1 may be exceptionally shut down upon request particularly for the sake of safety. For example, in a case where it is required to generate negative pressure for a brake pedal assist, to generate negative pressure in an engine intake passage, there may be performed motoring control in which the electric generator 2 is driven by battery power to start the engine 1 even when the vehicle is in charge mode.

At time t1, the generated electric power is steeply increased according to the rise of the vehicle speed, and it can be seen that the average charging current from that point onwards shows an increasing trend. From time t1 onwards, while the average charging current is restricted so that the slope of its increase does not exceed the first upper limit, the average charging current is gradually increased till time t2. In this way, according to the power generation control in the present embodiment, by setting the first upper limit, the slope of increase in the average charging current is made relatively gentler than in normal mode, and thus it is possible to suppress a possibility that the state of the battery 4 may plunge into the charging prohibition stage while the SOC is increased by electric power generated by the engine 1.

At time t2, due to the average charging current exceeding the power generation restriction threshold, the controller 10 performs power generation restriction that sets the second upper limit as an upper limit of charging electric power (power generation restriction flag=1). This further restricts the generated electric power, and makes the slope of increase in the average charging current gentler (see a dotted line); therefore, the increasing trend of the average charging current becomes moderate since time t2. It is to be noted that an amount of electric power generation restricted by the power generation restriction (an amount of power generation restriction) is appropriately adjusted according to the temperature of the battery 4 and the vehicle speed. For example, the amount of power generation restriction may be adjusted to be larger as the temperature of the battery 4 and the vehicle speed become higher.

Meanwhile, if power generation control is performed using only the first upper limit without imposition of the second upper limit, the average charging current continues to increase also after time t2 (see a solid line), and, at time t3, exceeds the Li precipitation protection threshold. As a result, the state of the battery 4 plunges into the charging prohibition stage, and charging is prohibited for a given period of time even though the vehicle is in charge mode.

In the present embodiment, the slope of increase in the average charging current is restricted to be gentler by the second upper limit, which makes it possible to prevent the average charging current from exceeding the Li precipitation protection threshold; therefore, it is possible to avoid a situation where charging is prohibited for a given period of time even though the vehicle is in charge mode. Then, under the restriction using the second upper limit, the average charging current is gradually decreased till time t4.

At time t4, due to the average charging current going below the power generation restriction cancellation threshold, the controller 10 cancels the power generation restriction, and changes the upper limit of the charging electric power from the second upper limit to the first upper limit (power generation restriction flag=0). As a result, the amount of electric power generated by the engine 1 is increased, and it can be seen that the average charging current again shows an increasing trend. From time t4 onwards, under the control using the first upper limit, the SOC of the battery 4 is gradually increased till time t5. Thus, even in a case where silent mode is selected after charge mode is off, the drive motor 6 can be driven by discharged electric power of the battery 4 charged while in charge mode.

Meanwhile, in a case where the second upper limit is not imposed, the state of the battery 4 plunges into the charging prohibition stage at time t3; therefore, even though charging of the battery 4 is not performed, electric power continues to be consumed to drive the drive motor 6. As a result, in conventional power generation control with no second upper limit set, the SOC of the battery 4 after charge mode is off (for example, at time t5) becomes lower than in the power generation control with the second upper limit set in the present embodiment.

As described above, the device for controlling the hybrid vehicle according to the embodiment is a device for controlling a hybrid vehicle including: the engine 1; the battery 4 charged with electric power by the engine 1; the motor 6 as a drive source; and the controller 10 that controls multiple running modes that can be selected through a mode operation. This device for controlling the hybrid vehicle has, as the running mode, normal mode configured to perform charging/discharging of the battery according to a running state and charge mode configured to perform electric power generation by the engine according to a mode operation. The controller 10 sets an upper limit (the first upper limit) of charging electric power based on generated electric power when in charge mode to be lower than an upper limit (the normal upper limit) of charging electric power based on generated electric power when in normal mode. Thus, in charge mode, an amount of electric power generated by the engine 1 is restricted so that an amount of charging electric power of the battery 4 does not exceed the first upper limit. As a result, an average charging current in a predetermined time is prevented from tending to increase, and charging of the battery 4 to an amount equal to or larger than a predetermined amount is avoided while increasing the SOC of the battery 4 according to a driver's demand, and thus it is possible to reduce a possibility that the state of the battery 4 may plunge into the charging prohibition stage.

Furthermore, according to the device for controlling the hybrid vehicle in the embodiment, in a case where the amount of charging electric power in a predetermined time when in charge mode exceeds a predetermined specified value (the power generation restriction threshold), the controller 10 further lowers the upper limit when in charge mode (sets the second upper limit). This increases the amount of charging in charge mode early on within a range up to the first upper limit, and, after the second upper limit is set, further suppresses a possibility that the amount of average charging electric power may reach the Li precipitation protection threshold, and thus it is possible to avoid the state of the battery 4 plunging into the charging prohibition stage when in charge mode.

Moreover, according to the device for controlling the hybrid vehicle in the embodiment, in a case where the battery 4 is charged with regenerative electric power generated by the drive motor 6, the controller 10 lowers the upper limit of charging electric power based on generated electric power when in charge mode according to the amount of regenerative electric power. Thus, it is possible to control electric power generated by the engine 1 in consideration of the regenerative electric power, and is possible to appropriately control charging electric power of the battery 4 within a range up to the set upper limit.

Furthermore, according to the device for controlling the hybrid vehicle in the embodiment, the controller 10 adjusts the upper limit (the first upper limit and the second upper limit) according to the temperature of the battery 4. Thus, it is possible to stably perform power generation control in which the state of the battery 4 is prevented from plunging into the charging prohibition stage even when any of the characteristics such as the internal resistance is changed by a change in the temperature of the battery 4.

The embodiment of the present invention has been described above; however, the above-described embodiment represents only some of application examples of the present invention, and is not intended to limit the technical scope of the present invention to the specific configuration of the above-described embodiment. For example, each value to be an indicator or an object to be controlled in the power generation control is not limited to that is described above.

For example, the generated electric power [kW] of the engine 1 may be replaced with power generation current [A] of the engine 1; the average charging current [A] may be replaced with average charging electric power [kW]. Furthermore, the average charging current per predetermined time may be the integrated value (the sum) of charging currents in the predetermined time. That is, the above-described power generation control can be performed using not only the indicator such as a current value used in the above-described embodiment but also another indicator that bears a proportionate relationship to the indicator.

The invention claimed is:

1. A method for controlling a hybrid vehicle including an engine, a battery charged with electric power generated by the engine, and a motor as a drive source, the method comprising:
   selecting an operation mode by a mode switch from operation modes comprising:
      a normal mode in which the battery is charged with electric power generated by the engine when a state of charge of the battery decreases to a predetermined value; and
      a charge mode in which the battery is charged with the electric power generated by the engine even if the state of charge of the battery is higher than the predetermined value; and
   when a charging current in the charge mode exceeds a predetermined specified value, setting an upper limit of the electric power generated by the engine in the charge mode to a value lower than an upper limit of the electric power generated by the engine in the normal mode.

2. The method for controlling the hybrid vehicle according to claim 1, wherein
   in a case where the battery is charged with regenerative electric power generated by the motor, the upper limit of the generated electric power in the charge mode is lowered according to an amount of the regenerative electric power.

3. The method for controlling the hybrid vehicle according to claim 1, further comprising adjusting the upper limit in the charge mode according to a temperature of the battery.

4. A device for controlling a hybrid vehicle including an engine, a battery charged with electric power generated by the engine, a motor as a drive source, and a controller, the device comprising:
   a mode switch configured to select an operation mode from operation modes comprising:
      a normal mode in which the battery is charged with electric power generated by the engine when a state of charge of the battery decreases to a predetermined value; and
      a charge mode in which the battery is charged with the electric power generated by the engine even if the state of charge of the battery is higher than the predetermined value, wherein the controller is configured to, in a case where a charging current in the charge mode exceeds a predetermined specified value, set an upper limit of the electric power generated by the engine in the charge mode to a value lower than an upper limit of the electric power generated by the engine in the normal mode.

5. The device for controlling the hybrid vehicle according to claim 4, wherein
in a case where the battery is charged with regenerative electric power generated by the motor, the controller lowers the upper limit of the generated electric power in the charge mode according to an amount of the regenerative electric power.

6. The device for controlling the hybrid vehicle according to claim 4, wherein the controller adjusts the upper limit in the charge mode according to a temperature of the battery.

* * * * *